(12) United States Patent
Kitahara et al.

US008293346B2

(10) Patent No.: US 8,293,346 B2
(45) Date of Patent: Oct. 23, 2012

(54) OXYGEN ABSORBENT AND OXYGEN-ABSORBING MULTI-LAYER BODY

(75) Inventors: Shizuo Kitahara, Tokyo (JP); Yasushi Tanaka, Tokyo (JP)

(73) Assignee: Zeon Corporation, Tokyo (JP)

( * ) Notice: Subject to any disclaimer, the term of this patent is extended or adjusted under 35 U.S.C. 154(b) by 557 days.

(21) Appl. No.: 11/886,024

(22) PCT Filed: Mar. 17, 2006

(86) PCT No.: PCT/JP2006/305335
§ 371 (c)(1),
(2), (4) Date: Jun. 3, 2008

(87) PCT Pub. No.: WO2006/101020
PCT Pub. Date: Sep. 28, 2006

(65) Prior Publication Data
US 2009/0061249 A1    Mar. 5, 2009

(30) Foreign Application Priority Data
Mar. 23, 2005 (JP) ................................ 2005-083397

(51) Int. Cl.
*B32B 1/00* (2006.01)
*B32B 27/08* (2006.01)
(52) U.S. Cl. ........... 428/35.4; 428/35.7; 525/57; 525/56
(58) Field of Classification Search ................. 428/35.4, 428/35.7; 525/57
See application file for complete search history.

(56) References Cited

U.S. PATENT DOCUMENTS

| | | | |
|---|---|---|---|
| 3,393,176 A * | 7/1968 | Vervloet ........................ 525/236 |
| 5,310,497 A * | 5/1994 | Ve Speer et al. ......... 252/188.28 |
| 5,399,289 A | 3/1995 | Speer et al. |
| 5,660,761 A | 8/1997 | Katsumoto et al. |
| 5,700,554 A * | 12/1997 | Speer et al. .................... 428/220 |
| 5,776,361 A | 7/1998 | Katsumoto et al. |
| 5,942,297 A * | 8/1999 | Speer et al. ..................... 428/35.4 |
| 6,254,946 B1 * | 7/2001 | Hirata et al. .................. 428/35.2 |
| 6,255,248 B1 * | 7/2001 | Bansleben et al. ............. 502/159 |
| 6,333,087 B1 * | 12/2001 | Jerdee et al. .................. 428/35.9 |
| 6,599,598 B1 | 7/2003 | Tai et al. |
| 6,822,031 B2 * | 11/2004 | Tai et al. ........................ 524/398 |
| 7,144,959 B2 * | 12/2006 | Kitahara ........................ 525/237 |
| 7,267,887 B2 * | 9/2007 | Kitahara et al. .............. 428/521 |
| 7,279,533 B2 * | 10/2007 | Kitahara et al. ........... 525/333.1 |
| 7,772,326 B2 * | 8/2010 | Kitahara ........................ 525/314 |
| 7,776,961 B2 * | 8/2010 | Kitahara et al. ................ 525/56 |
| 2001/0023025 A1 | 9/2001 | Jerdee et al. |
| 2002/0115768 A1 | 8/2002 | Kikushi et al. |
| 2002/0146527 A1 | 10/2002 | Kikuchi et al. |
| 2003/0018114 A1 * | 1/2003 | Tai et al. ........................ 524/413 |
| 2003/0157283 A1 | 8/2003 | Tai et al. |
| 2004/0176536 A1 | 9/2004 | Kikuchi et al. |
| 2005/0003220 A1 * | 1/2005 | Kitahara et al. .............. 428/521 |
| 2005/0131149 A1 * | 6/2005 | Kitahara ........................ 525/191 |
| 2005/0142373 A1 | 6/2005 | Komatsu et al. |
| 2005/0209412 A1 * | 9/2005 | Kitahara et al. ............ 525/331.9 |
| 2006/0063890 A1 * | 3/2006 | Kitahara et al. ............... 525/191 |
| 2006/0127655 A1 * | 6/2006 | Kitahara et al. ............... 428/212 |
| 2007/0123647 A1 * | 5/2007 | Kitahara et al. ................ 525/56 |
| 2008/0014395 A1 * | 1/2008 | Kitahara ....................... 428/36.5 |
| 2008/0090042 A1 * | 4/2008 | Kitahara ....................... 428/36.6 |
| 2008/0138549 A1 * | 6/2008 | Kitahara ....................... 428/35.4 |
| 2008/0191178 A1 * | 8/2008 | Kitahara ....................... 252/589 |
| 2008/0258105 A1 * | 10/2008 | Kitahara .................... 252/188.28 |
| 2009/0048397 A1 * | 2/2009 | Kitahara et al. ................ 525/95 |
| 2009/0061249 A1 * | 3/2009 | Kitahara et al. .............. 428/521 |
| 2009/0263602 A1 * | 10/2009 | Kitahara et al. ............. 428/36.6 |
| 2010/0126899 A1 * | 5/2010 | Kitahara .................... 206/524.4 |
| 2010/0187137 A1 * | 7/2010 | Kitahara et al. .............. 206/205 |

FOREIGN PATENT DOCUMENTS

| | | |
|---|---|---|
| EP | 0546546 A1 | 6/1993 |
| EP | 1586445 A1 | 10/2005 |
| JP | 60-223804 A | 11/1985 |
| JP | 4-211444 A | 8/1992 |
| JP | 5-156095 A | 6/1993 |
| JP | 5-170980 A | 7/1993 |
| JP | 8-502306 A | 3/1996 |
| JP | 11-70331 A | 3/1999 |
| JP | 11-347399 A | 12/1999 |
| JP | 2001-106920 A | 4/2001 |
| JP | 2001-507045 A | 5/2001 |
| JP | 2002-146217 A | 5/2002 |
| JP | 2002-523311 A | 7/2002 |
| JP | 2003-12944 A | 1/2003 |
| JP | 2003-504042 A | 2/2003 |
| JP | 2003-71992 A | 3/2003 |
| JP | 2003-253131 A | 9/2003 |
| JP | 2005-906 A | 1/2005 |
| JP | 2005-8823 A | 1/2005 |
| JP | 2005-18606 A | 7/2005 |
| JP | 2005-313145 A | 11/2005 |

(Continued)

OTHER PUBLICATIONS

Golub et al., "The Reaction of Polyisoprene with Titanium Tetrachloride," Canadian Journal of Chemistry, vol. 41, 1963, pp. 937-953.

(Continued)

*Primary Examiner* — Michele L Jacobson
(74) *Attorney, Agent, or Firm* — Birch, Stewart, Kolasch & Birch, LLP

(57) ABSTRACT

The objective of the invention is to provide a gas barrier resin composition that is excellent in oxygen absorbability and further excellent in adhesiveness to olefin resins, a structure comprising the same, and a multi-layer structure comprising the same. The oxygen-absorbing gas barrier resin composition disclosed comprises a cyclized product of a conjugated diene polymer and an ethylene/vinyl alcohol copolymer having a specified oxygen permeation rate. The oxygen-absorbing gas barrier resin composition further comprises an α-olefin resin. The oxygen-absorbing gas barrier structure is obtained by molding the subject oxygen-absorbing gas barrier resin composition. The oxygen-absorbing gas barrier multi-layer structure comprises a layer of the subject oxygen-absorbing gas barrier structure and a sealing material layer.

15 Claims, No Drawings

FOREIGN PATENT DOCUMENTS

| WO | WO 2004/018556 A1 | 3/2004 |
|---|---|---|
| WO | WO 2004/065119 A1 | 8/2004 |
| WO | WO 2005/053837 A1 | 6/2005 |

OTHER PUBLICATIONS

International Preliminary Report on Patentability and Translation of Written Opinion of the International Searching Authority, dated Jul. 3, 2007, for International Application No. PCT/JP2005/023562 (Forms PCT/IB/373 and PCT/ISA/237).

International Preliminary Report on Patentability and Written Opinion of the International Searching Authority, dated Dec. 6, 2007, for International Application No. PCT/JP2006/310670 (Forms PCT/IB/373 and PCT/ISA/237).

International Search Report, dated Apr. 4, 2006, for International Application No. PCT/JP2005/023562 (Form PCT/ISA/210).

International Search Report, dated Apr. 4, 2006, for International Application No. PCT/JP2005/023563 (Form PCT/ISA/210).

International Search Report, dated May 16, 2006, for International Application No. PCT/JP2006/305336 (Form PCT/ISA/210).

International Search Report, dated May 23, 2006, for International Application No. PCT/JP2006/305335 (Form PCT/ISA/210).

Tanaka et al., "Determination of Cyclicity in Cyclized Polybutadiene by H-NMR," Journal of Polymer Science: Polymer Chemistry Edition, vol. 17, 1979, pp. 3027-3029.

US Office Action, dated Apr. 28, 2010, for U.S. Appl. No. 11/794,440.

US Office Action, dated Apr. 30, 2010, for U.S. Appl. No. 11/794,155.

US Office Action, dated Dec. 10, 2010, U.S. Appl. No. 11/794,440.

US Office Action, dated Dec. 14, 2009, for U.S. Appl. No. 11/794,155.

US Office Action, dated Dec. 22, 2010, for U.S. Appl. No. 11/794,154.

US Office Action, dated Dec. 28, 2009, for U.S. Appl. No. 11/794,440.

US Office Action, dated Jan. 20, 2011, for U.S. Appl. No. 11/794,155.

US Office Action, dated Jan. 6, 2010, for U.S. Appl. No. 11/794,154.

US Office Action, dated Jul. 2, 2010, for U.S. Appl. No. 11/794,155.

US Office Action, dated Jun. 1, 2009, for U.S. Appl. No. 11/794,155.

US Office Action, dated Jun. 1, 2009, for U.S. Appl. No. 11/794,440.

US Office Action, dated Jun. 23, 2010, for U.S. Appl. No. 11/794,154.

US Office Action, dated Jun. 9, 2009, for U.S. Appl. No. 11/794,154.

US Office Action, dated May 3, 2010, for U.S. Appl. No. 11/794,154.

US Office Action, dated Nov. 14, 2008, for U.S. Appl. No. 11/794,154.

US Office Action, dated Nov. 14, 2008, for U.S. Appl. No. 11/794,440.

US Office Action, dated Oct. 29, 2010, for U.S. Appl. No. 11/885,991.

US Office Action, dated Oct. 29, 2010, for U.S. Appl. No. 11/921,243.

US Office Action, dated Oct. 30, 2008, for U.S. Appl. No. 11/794,155.

U.S. Office Action, dated Mar. 31, 2011, for copending U.S. Appl. No. 11/885,991.

U.S. Office Action, dated Mar. 31, 2011, for copending U.S. Appl. No. 11/921,243.

Office Action dated Jun. 3, 2011 for copending U.S. Appl. No. 11/794,155.

Office Action dated Jun. 3, 2011 for copending U.S. Appl. No. 11/794,440.

Office Action dated Jun. 6, 2011 for copending U.S. Appl. No. 11/794,154.

Office Action dated Nov. 17, 2011 for copending U.S. Appl. No. 11/794,154.

Japanese Notification of Reasons for Rejection dated Mar. 6, 2012 for Japanese Application No. 2007-509235.

Office Action dated Feb. 14, 2012 for copending U.S. Appl. No. 11/885,991.

US Office Action, dated Jun. 28, 2012, for U.S. Appl. No. 11/794,154.

* cited by examiner

OXYGEN ABSORBENT AND OXYGEN-ABSORBING MULTI-LAYER BODY

TECHNICAL FIELD

The present invention relates to an oxygen absorbent for the purpose of preventing foodstuffs, drugs, and the like from deterioration in the quality caused due to oxygen and to an oxygen-absorbing multi-layer body comprising an oxygen absorbent layer containing this oxygen absorbent. In more detail, the invention relates to an oxygen absorbent which has excellent oxygen absorbability at room temperature, has a low content of metals and is less odorous after oxygen absorption and to an oxygen-absorbing multi-layer body comprising an oxygen absorbent layer containing this oxygen absorbent.

BACKGROUND ART

Foodstuffs, drinks, drugs, and the like are required to be stored in the absence of oxygen or under an extremely low oxygen condition because deterioration in the quality is caused due to oxygen.

For that reason, a container or a package for storing a foodstuff, a drink, a drug, or the like is filled with nitrogen; however, this method has problems, for example, that manufacturing costs increase and that when the container or the package is opened once, air flows thereinto from the outside, and thereafter, deterioration in the quality cannot be prevented. Accordingly, various investigations have been made for the purpose of absorbing residual oxygen in the container or the package to remove oxygen from the inside of the system.

As a method for removing oxygen in a container or a package, a method in which a separate small bag accommodating therein an oxygen absorbent mainly composed of an iron powder is disposed has hitherto been widely employed. However, though this method keeps the cost low and attains a fast oxygen absorption rate, it causes inconvenience in the case where a metal detector is used for the purpose of detecting a foreign substance or in the case where the container or the package is applied for a microwave oven as it is.

In the case of a resin-made container or packaging material, investigations have been made for imparting oxygen absorbability to the container or packaging material per se.

For example, it is proposed to use an oxygen absorbent comprising a polyterpene such as poly($\alpha$-pinene), poly($\beta$-pinene) or poly(dipentene) and a transition metal salt acting as an oxygen absorption catalyst such as cobalt neodecanoate or cobalt oleate (Patent Document 1).

It is also proposed to use an oxygen absorbent comprising a conjugated diene polymer such as polyisoprene or 1,2-polybutadiene and a transition metal salt (Patent Document 2).

Furthermore, it is proposed to use an oxygen absorbent comprising a copolymer of ethylene with cyclopentene and a transition metal salt (Patent Document 3).

However, each of the compositions disclosed in these patent documents does not exhibit sufficient oxygen absorption performances and involves a problem that a peculiar odor, which is presumably caused by-products of oxygen-trapping reactions, remains in a packaging container. Further, since all of them contain a transition metal, they have risks that the polymer is liable to be deteriorated with the progress of oxygen absorption reactions causing remarkable reduction in mechanical strengths of the packaging material and that the transition metal salt is liable to elute. Therefore, it is difficult to employ them in some applications.

Patent Document 1: WO 98/06779
Patent Document 2: JP-A-2003-71992
Patent Document 3: WO 01/003521

DISCLOSURE OF THE INVENTION

Problems that the Invention is to Solve

In order to solve the foregoing problems, the present inventors made extensive and intensive investigations and, as a result, found that an oxygen absorbent containing a cyclized product of a conjugated diene polymer as an active ingredient exhibits high oxygen absorbability even when a transition metal salt is not added as a catalyst and keeps high mechanical strength even after oxygen absorption and proposed an oxygen absorbent comprising a cyclized product of a conjugated diene polymer as an active ingredient (Japanese Patent Application No. 2003-406464).

Thereafter, the present inventors further studied the foregoing oxygen absorbent and, as a result, have found that the oxygen absorbability can be further enhanced by using jointly two kinds of cyclized products of a conjugated diene polymer having a rate of reduction of unsaturated bonds within a specified range different from each other and has accomplished the invention on the basis of this knowledge.

Means for Solving the Problems

Thus, the invention provides an oxygen absorbent comprising a cyclized product (A) of a conjugated diene polymer and a cyclized product (B) of a conjugated diene polymer, wherein a rate of reduction of unsaturated bonds (%) of the cyclized product (B) of a conjugated diene polymer is at least 5 points smaller than a rate of reduction of unsaturated bonds (%) of the cyclized product (A) of a conjugated diene polymer.

In the oxygen absorbent of the invention, the rate of reduction of unsaturated bonds of the cyclized product (A) of a conjugated diene polymer is preferably 60% or more, and more preferably from 65 to 75%.

In the oxygen absorbent of the invention, the rate of reduction of unsaturated bonds of the cyclized product (B) of a conjugated diene polymer is preferably less than 60%, and more preferably from 40 to 55%.

In the oxygen absorbent of the invention, a content ratio of the cyclized product (A) of a conjugated diene polymer/the cyclized product (B) of a conjugated diene polymer is preferably from 60/40 to 95/5 in terms of a weight ratio.

In the oxygen absorbent of the invention, it is preferable that each of the cyclized product (A) of a conjugated diene polymer and the cyclized product (B) of a conjugated diene polymer has a weight-average molecular weight of from 10,000 to 1,000,000.

In the oxygen absorbent of the invention, it is preferable that the cyclized product (A) of a conjugated diene polymer and/or the cyclized product (B) of a conjugated diene polymer are each independently a cyclized product of polyisoprene or a cyclized product of a styrene/isoprene block copolymer.

In the oxygen absorbent of the invention, it is also preferable that the cyclized product (A) of a conjugated diene polymer is a cyclized product of a styrene/isoprene block copolymer and the cyclized product (B) of a conjugated diene polymer is a cyclized product of polyisoprene.

In the oxygen absorbent of the invention, it is also preferable that the cyclized product (A) of a conjugated diene polymer is a cyclized product of polyisoprene and the cyclized product (B) of a conjugated diene polymer is a cyclized product of a styrene/isoprene block copolymer.

The invention also provides an oxygen absorbent comprising a cyclized product (A) of a conjugated diene polymer, a cyclized product (B) of a conjugated diene polymer and a thermoplastic resin (C) and having a ratio of the component (C) to the total sum of the component (A), the component (B) and the component (C) of not more than 70% by weight.

In the oxygen absorbent of the invention, it is preferable that the thermoplastic resin is at least one member selected from the group consisting of poly-α-olefin resins, polyester resins, polyamide resins and polyvinyl alcohol resins.

It is preferable that the oxygen absorbent of the invention contains from 10 to 8,000 ppm of an antioxidant.

The invention also provides an oxygen-absorbing multi-layer body comprising a gas barrier material layer, an oxygen absorbent layer comprising the oxygen absorbent of the invention and a sealing material layer laminated in this order.

It is preferable that the oxygen-absorbing multi-layer body of the invention has a film or sheet form.

The invention also provides a packaging container comprising the oxygen-absorbing multi-layer body of the invention.

Advantages of the Invention

The oxygen absorbent of the invention exhibits excellent oxygen absorbability and does not cause a problem of a residual odor. The oxygen-absorbing multi-layer sheet of the invention obtained by using this oxygen absorbent exhibits excellent oxygen absorbability and does not cause a problem of a residual odor. The oxygen-absorbing multi-layer body of the invention is suitable as a packaging material of various foodstuffs, chemicals, drugs, cosmetics, and the like.

BEST MODES FOR CARRYING OUT THE INVENTION

The oxygen absorbent of the invention comprises a cyclized product of a conjugated diene polymer.

The cyclized product of a conjugated diene polymer used in the invention is obtained by a cyclization reaction of a conjugated diene polymer in the presence of an acid catalyst.

As the conjugated diene polymer, homopolymers and copolymers of a conjugated diene monomer and copolymers of a conjugated diene monomer with a monomer copolymerizable therewith can be used.

The conjugated diene monomer is not particularly limited, and specific examples thereof include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, and the like.

These monomers may be used singly or in combination of two or more kinds thereof.

Examples of other monomer copolymerizable with the conjugated diene monomer include an aromatic vinyl monomer such as styrene, o-methylstyrene, p-methylstyrene, m-methylstyrene, 2,4-dimethylstyrene, ethylstyrene, p-t-butylstyrene, α-methylstyrene, α-methyl-p-methylstyrene, o-chlorostyrene, m-chlorostyrene, p-chlorostyrene, p-bromostyrene, 2,4-dibromostyrene or vinylnaphthalene; a linear olefin monomer such as ethylene, propylene or 1-butene; a cyclic olefin monomer such as cyclopentene or 2-norbornene; a non-conjugated diene monomer such as 1,5-hexadiene, 1,6-heptadiene, 1,7-octadiene, dicyclopentadiene or 5-ethylidene-2-norbornene; a (meth)acrylic ester such as methyl (meth)acrylate or ethyl (meth)acrylate; other (meth)acrylic acid derivative such as (meth)acrylonitrile or (meth)acrylamide; and the like.

These monomers may be used singly or in combination of two or more kinds thereof.

Specific examples of the conjugated diene polymer include a natural rubber (NR), a styrene/butadiene rubber (SBR), a polyisoprene rubber (IR), a polybutadiene rubber (BR), an isoprene/isobutylene copolymer rubber (IIR), an ethylene/propylene/diene copolymer rubber (EPDM), a butadiene/isoprene copolymer rubber (BIR), an aromatic vinyl/conjugated diene block copolymer, and the like. Of these, a polyisoprene rubber, a polybutadiene rubber and a styrene/isoprene block copolymer are preferable, and a polyisoprene rubber and a styrene/isoprene block copolymer are more preferable.

These conjugated diene polymers may be used singly or in combination of two or more kinds thereof.

The content of the conjugated diene monomer unit in the conjugated diene polymer is properly chosen within the range where the effects of the invention are not impaired and is usually 40% by mole or more, preferably 60% by mole or more, and more preferably 75% by mole or more. When the content of the conjugated diene monomer unit is too low, there may be a risk that it is difficult to obtain a rate of reduction of unsaturated bonds falling within an appropriate range.

A polymerization method of the conjugated diene polymer may follow a usual way and, for example, is carried out by means of solution polymerization or emulsion polymerization by using an appropriate catalyst such as a Ziegler polymerization catalyst containing titanium or the like as a catalyst component, an alkyllithium polymerization catalyst or a radical polymerization catalyst.

The cyclized product of a conjugated diene polymer used in the invention is obtained by a cyclization reaction of the foregoing conjugated diene polymer in the presence of an acid catalyst.

As the acid catalyst used in the cyclization reaction, known acid catalysts can be used. Specific examples thereof include sulfuric acid; organic sulfonic acid compounds such as fluoromethanesulfonic acid, difluoromethanesulfonic acid, p-toluenesulfonic acid, xylenesulfonic acid, alkylbenzenesulfonic acids containing an alkyl group having from 2 to 18 carbon atoms or anhydrides or alkyl esters thereof; Lewis acids such as boron trifluoride, boron trichloride, tin tetrachloride, titanium tetrachloride, aluminum chloride, diethylaluminum monochloride, ethylammonium chloride, aluminum bromide, antimony pentachloride, tungsten hexachloride or iron chloride; and the like. These acid catalysts may be used singly or in combination of two or more kinds thereof. Of these, organic sulfonic acid compounds are preferable; and p-toluenesulfonic acid and xylenesulfonic acid are more preferable.

The used amount of the acid catalyst is usually from 0.05 to 10 parts by weight, preferably from 0.1 to 5 parts by weight, and more preferably from 0.3 to 2 parts by weight based on 100 parts by weight of the conjugated diene polymer.

The cyclization reaction is usually carried out after dissolving the conjugated diene polymer in a hydrocarbon solvent.

The hydrocarbon solvent is not particularly limited so far as it does not impair the cyclization reaction, and examples thereof include an aromatic hydrocarbon such as benzene, toluene, xylene or ethylbenzene; an aliphatic hydrocarbon such as n-pentane, n-hexane, n-heptane or n-octane; and an alicyclic hydrocarbon such as cyclopentane or cyclohexane. A boiling point of such a hydrocarbon solvent is preferably 70° C. or higher.

The solvent used in the polymerization reaction of the conjugated diene polymer and the solvent used in the cyclization reaction may be the same kind. In that case, the cyclization reaction can be carried out subsequent to the polymerization reaction by adding the acid catalyst for the cyclization reaction into a polymerization reaction solution in which the polymerization reaction has completed.

The amount to be used of the hydrocarbon solvent is such that the solids content of the conjugated diene polymer is usually in the range of from 5 to 60% by weight, and preferably from 20 to 40% by weight.

The cyclization reaction can be carried out under any pressure condition of elevated pressure, reduced pressure or atmospheric pressure and is desirably carried out under atmospheric pressure from the standpoint of simplicity and easiness of operations. When the cyclization reaction is carried out in a dry gas stream, and especially in an atmosphere of dry nitrogen or dry argon, it is possible to suppress side reactions to be caused due to the moisture.

Reaction temperature and reaction time in the cyclization reaction are not particularly limited. The reaction temperature is usually from 50 to 150° C., and preferably from 70 to 110° C.; and the reaction time is usually from 0.5 to 10 hours, and preferably from 2 to 5 hours.

After the cyclization reaction, the acid catalyst is deactivated by a usual way, the acid catalyst residue is removed, and the hydrocarbon solvent is then removed, whereby a cyclized product of a conjugated diene polymer in a solid state can be obtained.

It is necessary that the oxygen absorbent of the invention comprises a cyclized product (A) of a conjugated diene polymer and a cyclized product (B) of a conjugated diene polymer, wherein a rate of reduction of unsaturated bonds (%) of the cyclized product (B) of a conjugated diene polymer is at least 5 points smaller than the rate of reduction of unsaturated bonds (%) of the cyclized product (A) of a conjugated diene polymer.

Here, it is meant by the terms "at least 5 points" that a numerical value of the rate of reduction of unsaturated bonds of the cyclized product (A) of a conjugated diene polymer is at least 5 points larger than the numerical value of the rate of reduction of unsaturated bonds of the cyclized product (B) of a conjugated diene polymer; and for example, in the case where the rate of reduction of unsaturated bonds of the cyclized product (A) of a conjugated diene polymer is 75% and the rate of reduction of a cyclized product (B) of a conjugated diene polymer is 55%, the difference in the rate of reduction of unsaturated bonds between them is 20 points.

By using jointly two kinds of cyclized products of a conjugated diene polymer having a different rate of reduction of unsaturated bonds from each other by at least 5 points, not only the oxygen absorbability at room temperature is excellent, but also an odor at the oxygen absorption can be largely reduced.

The difference between the rate of reduction of unsaturated bonds (%) of the cyclized product (A) of a conjugated diene polymer and the rate of reduction of unsaturated bonds (%) of the cyclized product (B) of a conjugated diene polymer is preferably 10 points or more.

In the invention, the rate of reduction of unsaturated bonds of the cyclized product (A) of a conjugated diene polymer is preferably 60% or more, and more preferably from 65 to 75%.

On the other hand, the rate of reduction of unsaturated bonds of the cyclized product (B) of a conjugated diene polymer is preferably less than 60%, and more preferably from 40 to 55%.

When the rate of reduction of unsaturated bonds of each of the cyclized product (A) of a conjugated diene polymer and the cyclized product (B) of a conjugated diene polymer falls within the foregoing range, in the oxygen-absorbing multilayer body of the invention, strengths of the oxygen absorbent layer comprising the cyclized products of a conjugated diene polymer are excellent, and adhesive strength of the oxygen absorbent layer to other layers such as a gas barrier material layer or a sealing material is also excellent.

In the oxygen absorbent of the invention, it is preferable that a content ratio of a cyclized product (A) of a conjugated diene polymer/a cyclized product (B) of a conjugated diene polymer is from 60/40 to 95/5. When the content ratio of a cyclized product (A) of a conjugated diene polymer/a cyclized product (B) of a conjugated diene polymer falls within the foregoing range, it is possible to obtain an oxygen absorbent which exhibits especially excellent oxygen absorbability at room temperature and gives less odor at the oxygen absorption.

In the oxygen absorbent of the invention, it is preferable that either one of the cyclized product (A) of a conjugated diene polymer and the cyclized product (B) of a conjugated diene polymer is a cyclized product of polyisoprene, with the other being a cyclized product of a styrene/isoprene copolymer because the oxygen absorption performance is especially excellent.

Though it is sufficient that the oxygen absorbent of the invention contains the cyclized product (A) of a conjugated diene polymer and the cyclized product (B) of a conjugated diene polymer having a rate of reduction of unsaturated bonds (%) of at least 5 points smaller than the rate of reduction of unsaturated bonds (%) of the cyclized product (A) of a conjugated diene polymer, it is preferable that the oxygen absorbent of the invention is one obtained by mixing the cyclized product (A) of a conjugated diene polymer and the cyclized product (B) of a conjugated diene polymer.

A mixing method is not particularly limited, and known methods can be employed. For example, mixing can be achieved by a solution casting method in which after the cyclized product (A) of a conjugated diene polymer and the cyclized product (B) of a conjugated diene polymer are dissolved in a solvent, the resultant solution is applied on an almost flat surface and dried; a method in which the cyclized product (A) of a conjugated diene polymer and the cyclized product (B) of a conjugated diene polymer are melted and kneaded by a kneading machine such as an extruder, a kneader, and/or a Banbury mixer; and the like.

When the cyclized product (B) of a conjugated diene polymer is a cyclized product of polyisoprene, it is preferred to mix it with a thermoplastic resin in advance because handleability of the cyclized product (B) of a conjugated diene polymer on molding processing is enhanced.

The rate of reduction of unsaturated bonds of the cyclized product of a conjugated diene polymer can be adjusted by choosing properly the amount of the acid catalyst, the reaction temperature, the reaction time, and the like in the cyclization reaction.

In order to obtain a cyclized product of a conjugated diene polymer having a desired rate of reduction of unsaturated bonds, a method in which calibration curves regarding the amount of the acid catalyst, the reaction temperature, the reaction time, and the like in the cyclization reaction are previously prepared, respectively, and the cyclization reaction is carried out on the basis of these calibration curves, or other methods may be employed.

In a conjugated diene monomer unit segment in the conjugated diene polymer, the rate of reduction of unsaturated bonds is an index to express a degree of reduction of unsaturated bonds due to the cyclization reaction and is a numerical value determined in the following manner. That is, in the conjugated diene monomer unit segment in the conjugated diene polymer, a ratio of a peak area of protons bonded directly to the double bond relative to a peak area of all protons is determined before and after the cyclization reaction, respectively, by means of a proton NMR analysis, and a rate of reduction thereof is calculated.

In the conjugated diene monomer unit segment in the conjugated diene polymer, a peak area of all protons and a peak area of protons bonded directly to the double bond before the cyclization reaction are defined as SBT and SBU, respectively; and a peak area of all protons and a peak area of protons bonded directly to the double bond after the cyclization reaction are defined as SAT and SAU, respectively. A peak area ratio (SB) of the protons bonded directly to the double bond before the cyclization reaction is determined by "SB=SBU/SBT"; and a peak area ratio (SA) of the protons bonded directly to the double bond after the cyclization reaction is determined by "SA=SAU/SAT".

Accordingly, the rate of reduction of unsaturated bonds is determined by the following expression.

$$[\text{Rate of reduction of unsaturated bonds}(\%)]=100\times(SB-SA)/SB$$

A weight-average molecular weight of each of the cyclized product (A) of a conjugated diene polymer and the cyclized product (B) of a conjugated diene polymer is preferably from 10,000 to 1,000,000, more preferably from 20,000 to 700,000, and further preferably from 30,000 to 500,000 in terms of standard polystyrene as measured by gel permeation chromatography. The weight-average molecular weight of the cyclized product of a conjugated diene polymer can be adjusted by choosing properly a weight-average molecular weight of the conjugated diene polymer to be provided for the cyclization.

When the weight-average molecular weight of the cyclized product of a conjugated diene polymer is too low, there may be risks that film formation is difficult and that mechanical strengths are reduced. When the weight-average molecular weight of the cyclized product of a conjugated diene polymer is too large, there may be a risk that not only solution viscosity increases during the cyclization reaction thereby making it difficult to handle but also workability on extrusion molding is reduced.

Though the amount of a gel (toluene-insoluble matter) of the cyclized product of a conjugated diene polymer is usually not more than 10% by weight, and preferably not more than 5% by weight, it is especially preferable that the cyclized product of a conjugated diene polymer substantially contains no gel. When the amount of the gel is high, there may be a risk that smoothness of the film is impaired.

In the invention, in order to guarantee stability at the time of processing of the cyclized product of a conjugated diene polymer, an antioxidant can be added in the cyclized product of a conjugated diene polymer. The amount of the antioxidant is not particularly limited, and in the case of the cyclized product (A) of a conjugated diene polymer, the amount of the antioxidant is in the range of from 10 to 8,000 ppm, preferably from 50 to 5,000 ppm, and more preferably from 100 to 3,000 ppm based on the weight of the cyclized product (A) of a conjugated diene polymer relative to its weight. In the case of the cyclized product (B) of a conjugated diene polymer, the amount of the antioxidant is in the range of from 10 to 8,000 ppm, preferably from 30 to 5,000 ppm, and more preferably from 50 to 3,000 ppm relative to its weight.

The amount of the antioxidant in the oxygen absorbent of the invention is usually in the range of from 10 to 8,000 ppm, preferably from 30 to 5,000 ppm, and more preferably from 50 to 3,000 ppm. However, since when the added amount of the antioxidant it too large, the oxygen absorbability is reduced, it is important to adjust properly the added amount thereof taking into consideration stability at the time of processing of the oxygen absorbent.

The antioxidant is not particularly limited so far as it is one usually used in the field of a resin material or a rubber material. Representative examples of such an antioxidant include hindered phenolic, phosphorus-containing and lactone-based antioxidants. These antioxidants can also be used in combination of two or more kinds thereof. In particular, a combination of a phenolic antioxidant and a phosphorus-containing antioxidant is preferable. An amine light stabilizer (HALS) may also be added.

Specific examples of the hindered phenolic antioxidant include 2,6-di-t-butyl-p-cresol, pentaerythritol tetrakis[3-(3,5-di-t-butyl-4-hydroxyphenyl)propionate], thiodiethylene bis[3-(3,5-di-t-butyl-4-hydroxyphenyl)propionate], octadecyl-3-(3,5-di-t-butyl-4-hydroxyphenyl)propionate, N,N'-hexane-1,6-diyl bis[3-(3,5-di-t-butyl-4-hydroxyphenyl)propionamide], diethyl [[3,5-bis(1,1-dimethylethyl)-4-hydroxyphenyl]methyl]phosphonate, 3,3',3",5,5',5"-hexa-t-butyl-a,a',a"-(mesitylene-2,4,6-triyl)tri-p-cresol, hexamethylene bis[3-(3,5-di-t-butyl)-4-hydroxyphenyl]propionate, tetrakis[methylene-3-(3,5-di-t-butyl-4-hydroxyphenyl)propionate]methane, n-octadecyl-3-(4'-hydroxy-3,5'-di-t-butylphenyl)propionate, 1,3,5-tris (3,5-di-t-butyl-4-hydroxybenzyl)-1,3,5-triazine-2,4,6(1H,3H,5H)-trione, 2,4-bis(n-octylthio)-6-(4-hydroxy-3,5-di-t-butylanilino)-1,3,5-triazine, tris-(3,5-di-t-butyl-4-hydroxybenzyl)-isocyanurate, 2-t-butyl-6-(3'-t-butyl-2'-hydroxy-5'-methylbenzyl)-4-methylphenyl acrylate, 2-[1-(2-hydroxy-3,5-di-t-phenyl)ethyl]-4,6-di-t-pentylphenyl acrylate, and the like.

Specific examples of the phosphorus-containing antioxidant include 2,2'-methylenebis(4,6-di-t-butylphenyl)octyl phosphite, tris(2,4-di-t-butylphenyl) phosphite, bis[2,4-bis(1,1-dimethylethyl)-6-methylphenyl]ethyl phosphite, tetrakis(2,4-di-t-butylphenyl)[1,1-biphenyl]-4,4'-diyl bisphosphonite, bis(2,4-di-t-butylphenyl)pentaerythritol diphosphite, bis(2,6-di-t-butyl-4-methylphenyl)pentaerythritol diphosphite, and the like.

Examples of the lactone-based antioxidant include a reaction product between 5,7-di-t-butyl-3-(3,4-dimethylphenyl)-3H-benzofuran-2-one, etc. and o-xylene.

Besides, various compounds usually added may be blended in the cyclized product of a conjugated diene polymer, if desired. Examples of such a compound include compounds usually used in an adhesive, inclusive of a filler such as calcium carbonate, alumina or titanium oxide; a tackifier (for example, hydrogenated petroleum resins, hydrogenated terpene resins, castor oil derivatives, sorbitan higher fatty acid esters, or low-molecular weight polybutene); a plasticizer (for example, phthalic esters or glycol esters); a surfactant; a leveling agent; an ultraviolet light absorbent; a light stabilizer; a dehydrating agent; a pot life extender (for example, acetylacetone, methanol, methyl orthoacetate, or the like); a cissing improving agent; or the like.

In the oxygen absorbent of the invention, a polymer material other than the cyclized product of a conjugated diene polymer can be blended. By blending a polymer material other than the cyclized product of a conjugated diene polymer in the oxygen absorbent of the invention, tear strength of the oxygen absorbent is enhanced.

The polymer material other than the cyclized product of a conjugated diene polymer to be used is not particularly limited, and a thermoplastic resin is preferable. Various rubbers can also be used jointly with the thermoplastic resin.

The polymer material other than the cyclized product of a conjugated diene polymer may be used singly or in combination of two or more kinds thereof.

In the oxygen absorbent comprising a cyclized product of a conjugated diene polymer and a polymer material other than the cyclized product of a conjugated diene polymer, the content of the cyclized product of a conjugated diene polymer is preferably 10% by weight or more, more preferably 20% by weight or more, further preferably 30% by weight or more, and especially preferably 40% by weight or more. In the range above, the balance between the oxygen absorbability and the tear strength is kept good, and the higher the proportion of the cyclized product of a conjugated diene polymer, the better the oxygen absorbability is.

The thermoplastic resin to be used jointly with the cyclized product of a conjugated diene polymer is not particularly limited and is preferably at least one member selected from the group consisting of poly-α-olefin resins, polyester resins, polyamide resins and polyvinyl alcohol resins.

Besides, aromatic vinyl resins such as polystyrene; vinyl halide resins such as polyvinyl chloride; fluorocarbon resins; acrylic resins such as methacrylic resins; polycarbonate resins; polyurethane resins; or the like can also be used.

The poly-α-olefin resin may be any one of a homopolymer of an α-olefin, a copolymer of two or more kinds of α-olefins, or a copolymer of an α-olefin with a monomer other than the α-olefin and may also be one obtained by modifying such a (co)polymer.

Specific examples of the poly-α-olefin resin include homopolymers or copolymers of an α-olefin such as ethylene or propylene, for example, α-olefin homopolymers inclusive of polyethylenes such as linear low-density polyethylene (LLDPE), low-density polyethylene (LDPE), medium-density polyethylene (MDPE), high-density polyethylene (HDPE) or metallocene polyethylene, polypropylene, metallocene polypropylene, polymethylpentene, polybutene, and the like; copolymers of ethylene with other α-olefin, for example, an ethylene/propylene random copolymer, an ethylene/propylene block copolymer, an ethylene/propylene/polybutene-1 copolymer, an ethylene/cyclic olefin copolymer, or the like; copolymers of an α-olefin as the main component with a carboxylic acid unsaturated alcohol, or saponified products thereof, for example, an ethylene/vinyl acetate copolymer, an ethylene/vinyl alcohol copolymer, or the like; copolymers of an α-olefin as the main component with an α,β-unsaturated carboxylic acid ester or an α,β-unsaturated carboxylic acid or the like, for example, ethylene/α,β-unsaturated carboxylic acid ester copolymers (for example, an ethylene/ethyl acrylate copolymer, an ethylene/methyl methacrylate copolymer, or the like), ethylene/α,β-unsaturated carboxylic acid copolymers (for example, an ethylene/acrylic acid copolymer, an ethylene/methacrylic acid copolymer, or the like), or the like; acid-modified poly-α-olefin resins obtained by modifying an α-olefin (co)polymer such as polyethylene or polypropylene with an unsaturated carboxylic acid such as acrylic acid, methacrylic acid, maleic acid, maleic anhydride, fumaric acid or itaconic acid; ionomer resins obtained by making an Na ion or a Zn ion act on a copolymer of ethylene with methacrylic acid or the like; mixtures thereof; and the like.

Specific examples of the polyester resin include polyethylene terephthalate, polybutylene terephthalate, polyethylene terephthalate having cyclohexanedimethanol copolymerized therewith (copolymerized PET), and the like.

Specific examples of the polyamide resin include nylon 6, nylon 66, nylon 610, nylon 11, nylon 12, copolymers thereof, and the like.

Specific examples of the polyvinyl alcohol resin include polyvinyl alcohol, partially or completely saponified products of an ethylene/vinyl acetate copolymer, and the like.

Of these thermoplastic resins, poly-α-olefin resins, especially olefin homopolymers such as polyethylene or polypropylene and copolymers of ethylene with an α-olefin such as random and block ethylene/propylene copolymers are preferable because of excellent compatibility with the cyclized product of a conjugated diene polymer.

Incorporation of the poly-α-olefin resin permits uniform blending readily at the preparation of the oxygen absorbent of the invention.

A ratio of the thermoplastic resin (C) in the oxygen absorbent of the invention is preferably not more than 70% by weight, and more preferably not more than 60% by weight based on the total sum of the cyclized product (A) of a conjugated diene polymer, the cyclized product (B) of a conjugated diene polymer and the thermoplastic resin (C).

Examples of a rubber which can be used jointly with such a thermoplastic resin include a natural rubber, a polybutadiene rubber, a polyisoprene rubber, a poly(acrylonitrile/butadiene) rubber, a poly(styrene/butadiene) rubber, a poly(ethylene/propylene/diene) rubber, an acrylic rubber, and the like.

The oxygen-absorbing multi-layer body of the invention is a multi-layer body comprising a gas barrier material layer, an oxygen absorbent layer and a sealing material layer laminated in this order.

The structure of the oxygen-absorbing multi-layer body of the invention is not particularly limited and may be a film or a sheet or may have other structure.

The gas barrier material layer is a layer provided for the purpose of hindering the permeation of a gas from the outside. For example, when a packaging material having a bag-like shape is constituted of the oxygen-absorbing multi-layer body, the gas barrier material layer functions as an external layer. An oxygen permeability of the gas barrier material layer is preferably small as far as possible so far as processability and costs allow and is required to be not more than 100 cc (20μ)/m²·atm·day (at 25° C. and 65% RH), and more preferably not more than 50 cc (20μ)/m²·atm·day (at 25° C. and 65% RH) regardless of its thickness.

The material for constituting the gas barrier material layer is not particularly limited so far as it has a low permeability with a gas such as oxygen or water vapor, and metals, inorganic materials, resins, and the like are useful.

As the metal, aluminum having a low gas-permeability is generally useful. The metal may be laminated as a foil on a resin film or the like, or a thin film may be formed on a resin film or the like by means of vapor deposition.

As the inorganic material, metal oxides such as silica or alumina are useful, and these metal oxides are used singly or in combination upon vapor deposition on a resin film or the like.

Though resins are inferior to metals and inorganic materials with respect to gas barrier properties, they have various choices in mechanical properties, thermal properties, chemical resistance, optical properties, and manufacturing methods and are preferably used as a gas barrier material from the standpoint of these advantages. The resin used in the gas barrier material layer of the invention is not particularly limited, and all of resins having good gas barrier properties can be used, and use of a chlorine-free resin is preferable because noxious gases are not generated at the disposal by burning.

Of these, a transparent vapor-deposited film obtained by vapor deposition of an inorganic oxide on a resin film is preferable for use.

Specific examples of the resin used as the gas barrier material layer include polyvinyl alcohol resins such as polyvinyl alcohol or an ethylene/vinyl alcohol copolymer; polyester resins such as polyethylene terephthalate or polybutylene terephthalate; polyamide resins such as nylon 6, nylon 66, nylon 610, nylon 11, nylon 12, MXD nylon (poly-m-xylylene adipamide) or copolymers thereof; polyaramid resins; polycarbonate resins; polystyrene resins; polyacetal resins; fluorocarbon resins; polyether-based, adipate ester-based, caprolactone ester-based, polycarbonic acid ester-based and other thermoplastic polyurethanes; vinyl halide resins such as polyvinylidene chloride or polyvinyl chloride; polyacrylonitrile; copolymers of an α-olefin with vinyl acetate, an acrylic ester, a methacrylic ester or the like, for example, an ethylene/vinyl acetate copolymer, an ethylene/ethyl acrylate copolymer, an ethylene/methyl methacrylate copolymer, an ethylene/acrylic acid copolymer, an ethylene/methacrylic acid copolymer, and the like; acid-modified poly-α-olefin resins obtained by modifying an α-olefin (co)polymer such as polyethylene or polypropylene with an unsaturated carboxylic acid such as acrylic acid, methacrylic acid, maleic acid, maleic anhydride, fumaric acid or itaconic acid; ionomer resins obtained by making an Na ion or a Zn ion act on a copolymer of ethylene with methacrylic acid or the like; mixtures thereof; and the like. Vapor deposition of an inorganic oxide such as aluminum oxide or silicon oxide can also be achieved on such a gas barrier material layer.

Taking into consideration desired requirement such as gas barrier properties; mechanical properties including strength, toughness or rigidity; heat resistance; printability; transparency; or adhesiveness, these resins can be properly chosen depending upon the purpose as a multi-layer body. These resins may be used singly or in combination of two or more kinds thereof.

With the resin used as the gas barrier material layer can also be incorporated a heat stabilizer; an ultraviolet light absorbent; an antioxidant; a coloring agent; a pigment; a neutralizing agent; a plasticizer such as phthalic esters or glycol esters; a filler; a surfactant; a leveling agent; a light stabilizer; a dehydrating agent such as alkaline earth metal oxides; a deodorant such as activated carbon or zeolite; a tackifier (for example, castor oil derivatives, sorbitan higher fatty acid esters, and low-molecular weight polybutene); a pot life extender (for example, acetylacetone, methanol, methyl orthoacetate, and the like); a cissing improving agent; other resins (for example, poly-α-olefins); or the like.

An anti-blocking agent, an anti-fogging agent, a heat-resistant stabilizer, a weather-resistant stabilizer, a lubricant, an antistatic agent, a reinforcing material, a flame retardant, a coupling agent, a blowing agent, a mold releasing agent, or the like can be added, if desired.

For the purpose of imparting heat resistance or the like, a protective layer can be formed on the outside of the gas barrier material layer.

Examples of a resin used for the protective layer include ethylene polymers such as high-density polyethylene; propylene polymers such as a propylene homopolymer, a propylene/ethylene random copolymer or a propylene/ethylene block copolymer; polyamides such as nylon 6 or nylon 66; polyesters such as polyethylene terephthalate; and the like. Of these, polyamides and polyesters are preferable.

In the case where a polyester film, a polyamide film, an inorganic oxide vapor deposited film, a polyvinylidene chloride-coated film, or the like is used as the gas barrier material layer, such a gas barrier material layer also functions as a protective layer at the same time.

The oxygen absorbent layer of the oxygen-absorbing multi-layer body of the invention absorbs oxygen that permeates through the gas barrier material layer from the outside. When a packaging container having, for example, a bag-like shape is constituted of a packaging material comprising an oxygen-absorbing multi-layer sheet, the oxygen absorbent layer serves as a layer having a function to absorb oxygen on the inside of the packaging material via a sealing material layer.

The oxygen absorbent layer of the oxygen-absorbing multi-layer body of the invention comprises the oxygen absorbent of the invention.

In the oxygen-absorbing multi-layer body of the invention, the oxygen absorbent layer may contain a known oxygen-absorbing component other than the cyclized product of a conjugated diene polymer so far as the effects of the invention are not impaired. The amount of the oxygen-absorbing component other than the cyclized product of a conjugated diene polymer is less than 50% by weight, preferably less than 40% by weight, and more preferably less than 30% by weight relative to the whole amount of the oxygen-absorbing components (the total sum of the cyclized product of a conjugated diene polymer and the oxygen-absorbing component other than the cyclized product of a conjugated diene polymer).

In the oxygen-absorbing multi-layer body of the invention, the sealing material layer is a layer having a function to be melted by heat and mutually bonded (heat-sealed) thereby to form in the packaging container a space isolated from the outside of the packaging container and to make oxygen permeate therethrough and be absorbed in the oxygen absorbent layer while preventing the direct contact between the oxygen absorbent layer and a material to be packaged on the inside of the packaging container.

Specific examples of a heat-sealable resin used for forming the sealing material layer include homopolymers of an α-olefin such as ethylene or propylene, for example, low-density polyethylene, medium-density polyethylene, high-density polyethylene, linear low-density polyethylene, metallocene polyethylene, polypropylene, polymethylpentene, and polybutene; copolymers of ethylene with an α-olefin, for example, an ethylene/propylene copolymer; copolymers of an α-olefin as the main component with vinyl acetate, an acrylic ester, a methacrylic ester or the like, for example, an ethylene/vinyl acetate copolymer, an ethylene/ethyl acrylate copolymer, an ethylene/methyl methacrylate copolymer, an ethylene/acrylic acid copolymer, and an ethylene/methacrylic acid copolymer; acid-modified poly-α-olefin resins obtained by modifying an α-olefin (co)polymer such as polyethylene or polypropylene with an unsaturated carboxylic acid such as acrylic acid, methacrylic acid, maleic acid, maleic anhydride, fumaric acid or itaconic acid; ionomer resins obtained by making an Na ion or a Zn ion act on a copolymer of ethylene with methacrylic acid, or the like; mixtures thereof; and the like.

These resins may be used singly or in combination of two or more kinds thereof.

An antioxidant; a tackifier (for example, hydrogenated petroleum resins, hydrogenated terpene resins, castor oil derivatives, sorbitan higher fatty acid esters, low-molecular weight polybutene, and the like); an antistatic agent; a filler; a plasticizer (for example, phthalic esters, glycol esters, and the like); a surfactant; a leveling agent; a heat-resistant stabilizer; a weather-resistant stabilizer; an ultraviolet absorber; a light stabilizer; a dehydrating agent; a pot life extender (for example, acetylacetone, methanol, methyl orthoacetate, and the like); a cissing improving agent; an anti-blocking agent; an anti-fogging agent; a lubricant; a reinforcing material; a flame retardant; a coupling agent; a blowing agent; a mold releasing agent; a coloring agent; a pigment; and the like can be added to the heat-sealable resin, if desired.

Examples of the antioxidant include antioxidants of the same kind that can be added in the cyclized product of a conjugated diene polymer.

Examples of the anti-blocking agent include silica, calcium carbonate, talc, zeolite, starch, and the like. The anti-blocking agent may be kneaded into the resin or may be attached onto a surface of the resin.

Examples of the anti-fogging agent include higher fatty acid glycerides such as diglycerin monolaurate, diglycerin monopalmitate, diglycerin monooleate, diglycerin dilaurate or triglycerin monooleate; polyethylene glycol higher fatty acid esters such as polyethylene glycol oleate, polyethylene glycol laurate, polyethylene glycol palmitate or polyethylene glycol stearate; polyoxyethylene higher fatty acid alkyl ethers such as polyoxyethylene lauryl ether or polyoxyethylene oleyl ether; and the like.

Examples of the lubricant include higher fatty acid amides such as stearic acid amide, oleic acid amide, erucic acid amide, behenic acid amide, ethylene bisstearic acid amide or ethylene bisoleic acid amide; higher fatty acid esters; waxes; and the like.

Examples of the antistatic agent include glycerin esters, sorbitan acid esters, polyethylene glycol esters, and the like.

Examples of the reinforcing material include metallic fibers, glass fibers, carbon fibers, and the like.

Examples of the flame retardant include phosphoric esters, halogenated phosphoric esters, halides, and the like.

Examples of the coupling agent include silane-based, titanate-based, chromium-based, aluminum-based and other coupling agents.

Examples of the coloring agent or the pigment include phthalocyanine-based, indigo-based, quinacridone-based, metallic complex salt-based and other various azo pigments; basic or acidic water-soluble dyes; azo-based, anthraquinone-based, perylene-based and other oil-soluble dyes; titanium oxide, iron oxide, complex oxide and other metal oxides; and, chromate-based, sulfide-based, silicate-based, carbonate-based and other inorganic pigments.

Examples of the blowing agent include methylene chloride, butane, azobisisobutyronitrile, and the like.

Examples of the mold releasing agent include polyethylene waxes, silicone oils, long-chain carboxylic acids, long-chain carboxylic acid metal salts, and the like.

A deodorant or an adsorbent can be added in the heat-sealable resin. The deodorant or the adsorbent decomposes odorous components thereby preventing effectively the odorous components from transferring into the outside or inside of the multi-layer body.

Examples of the deodorant or the adsorbent include those which are known by themselves, for example, natural zeolite, synthetic zeolite, silica gel, activated carbon, impregnated activated carbon, activated clay, activated aluminum oxide, clay, diatomaceous earth, kaolin, talc, bentonite, magnesium oxide, iron oxide, aluminum hydroxide, magnesium hydroxide, iron hydroxide, magnesium silicate, aluminum silicate, synthetic hydrotalcite, amine-supporting porous silica, and the like. Of these, those containing an amino group such as amine-supporting porous silica are preferable from the viewpoint of reactivity with an aldehyde.

These deodorants or adsorbents may be used singly or in combination of two or more kinds thereof.

These deodorants or adsorbents have preferably a dispersed average particle size of not more than 10 μm for uniform distribution with ease thereof in the sealing material layer.

An oxygen permeability at 25° C. of the sealing material layer of the invention does not rely upon the number and thickness and constitutional materials of layers and is preferably 200 cc (20 μm)/m$^2$·atm·day (at 25° C. and 65% RH) or more, and especially preferably 400 cc (20 μm)/m$^2$·atm·day (at 25° C. and 65% RH) or more. When the oxygen permeability of the sealing material layer is lower than 200 cc (20 μm)/m$^2$·atm·day (at 25° C. and 65% RH), there is a risk that it determines the rate of the oxygen absorption to be carried out by the oxygen absorbing layer thereby reducing the oxygen absorption rate of the packaging container.

The permeability is expressed by a volume of a gas passing through a specimen of a unit area with a unit partial pressure difference for a unit time and can be measured by a method conforming to JIS K7126, "Test method for gas permeation rate of plastic films and sheets".

The oxygen-absorbing multi-layer body of the invention comprises basically a gas barrier material layer, an oxygen absorbent layer and a sealing material layer laminated in this order, and may have a supporting substrate layer, if desired. Examples of a material which constitutes the supporting substrate layer include poly-α-olefin resins; polyester resins such as polyethylene terephthalate (PET); polyamide resins such as polyamide 6 or a polyamide 6/polyamide 66 copolymer; natural fibers; synthetic fibers; and papers obtained by paper making of these materials.

The supporting substrate layer may be provided between the oxygen absorbent layer and the gas barrier material layer or may be provided in the order of oxygen absorbent layer/gas barrier material layer/supporting substrate layer.

For the purpose of bonding the respective layers, an adhesive layer may be provided. A film or sheet of a resin capable of being melted by heat and mutually fused can be used for the adhesive layer. Specific examples of such a resin include homopolymers or copolymers of an α-olefin such as low-density polyethylene, linear low-density polyethylene, medium-density polyethylene, high-density polyethylene or polypropylene; an ethylene/vinyl acetate copolymer, an ethylene/acrylic acid copolymer, an ethylene/ethyl acrylate copolymer, an ethylene/methacrylic acid copolymer, and an ethylene/methyl methacrylate copolymer; acid-modified poly-α-olefin resins obtained by modifying an α-olefin (co) polymer such as polyethylene or polypropylene with an unsaturated carboxylic acid such as acrylic acid, methacrylic acid, maleic acid or maleic anhydride; ionomer resins obtained by making an Na ion or a Zn ion act on a copolymer of ethylene with methacrylic acid, or the like; mixtures thereof; and the like.

A thickness of each of the gas barrier material layer, the oxygen absorbent layer and the sealing material layer constituting the oxygen-absorbing multi-layer body of the invention and a whole thickness of the oxygen-absorbing multi-layer body may be properly chosen depending upon its use.

When the thickness of each layer is too thin, there may be a risk that the thickness is non-uniform or that rigidity or mechanical strengths are insufficient. In the case of a heat-sealable resin, when the thickness is too thick or too thin, there may be a risk that heat-sealing properties are not exhibited.

The manufacturing method of the oxygen-absorbing multi-layer body of the invention is not particularly limited; and single-layer films or sheets of the respective layers constituting the multi-layer body may be obtained and laminated, or a multi-layer body may be molded directly.

The single-layer film or sheet can be manufactured by a known method. For example, the film or sheet can be obtained by a solution casting method in which a resin composition constituting each layer and the like are dissolved in a solvent, and the solution is then applied on a substantially flat surface and dried. For example, a T-die method film or sheet, a blown film or sheet, or the like is obtained by melting and kneading a resin composition or the like constituting each layer by an extruder and then extruding the mixture into a prescribed shape by passing through a T-die, a circular die (ring die) or the like. As the extruder, kneading machines such as a single-screw extruder, a twin-screw extruder or a Banbury mixer can be used. The T-die film or sheet can be formed into a biaxially stretched film or sheet by biaxial stretching.

The multi-layer body can be manufactured from the thus-obtained single-layer films or sheets by an extrusion coating method, sandwich lamination, or dry lamination.

For the manufacture of a multi-layer body, a known co-extrusion molding method can be employed; and for example, extrusion molding may be carried out in the same manner as described above, except that extruders in the number corresponding to the kinds of resins and using a multi-layer multiple die are used.

Examples of the co-extrusion molding method include a co-extrusion lamination method, a co-extrusion sheet molding method, a co-extrusion inflation molding method, and the like.

As one example, a raw fabric in a tubular state can be formed by melting and heating each of resins constituting a gas barrier material layer, an oxygen absorbent layer and a sealing material layer, respectively by several extruders; extruding them from a multi-layer ring die at an extrusion temperature of, for example, from 190 to 210° C.; and immediately thereafter, quenching for solidification the extrudate by a liquid coolant such as cooling water by means of a water-cooling or air-cooling inflation method.

In manufacturing the multi-layer body, the temperature of each of the resin for sealing material, the cyclized product of a conjugated diene polymer, the resin for gas barrier material layer, and the resin for supporting substrate layer to be used, if desired, and the like are preferably set up at from 160 to 250° C. There may be a risk that when the temperature is lower than 160° C., uneven thickness or breakage of the multi-layer body occurs; whereas when it exceeds 250° C., breakage of the multi-layer body is caused. The temperature is more preferably from 170 to 230° C.

A film take-up rate at the manufacture of a multi-layer body is usually from 2 to 200 m/min, and preferably from 50 to 100 m/min. There may be a risk that when the take-up rate is not more than 2 m/min, the production efficiency becomes worse whereas when it exceeds 200 m/min, the multi-layer body cannot be sufficiently cooled, and is fused on taking-up.

In the case where the multi-layer body comprises a stretchable material whose properties are enhanced by stretching such as polyamide resins, polyester resins or polypropylene, the multi-layer sheet obtained by co-extrusion can be further uniaxially or biaxially stretched. If desired, heat setting can be further performed.

A stretch ratio is not particularly limited and is usually from 1 to 5 times in a machine direction (MD) and a transverse direction (TD), respectively, and preferably from 2.5 to 4.5 times in the MD and TD, respectively.

The stretching can be carried out by a known method such as a tenter stretching system, an inflation stretching system or a roll stretching system. Though either of the machine direction stretching or transverse direction stretching may be earlier, simultaneous stretching is preferable. A tubular simultaneous biaxial stretching method may also be employed.

The gas barrier material layer can be subjected to front surface printing or rear surface printing or the like with a desired printing pattern, for example, letters, figures, symbols, designs, patterns, and the like by a usual printing method.

The oxygen-absorbing multi-layer body of the invention can be molded into a packaging container of every shape and used.

The packaging container of the invention can be used as a container of every form, for example, liquid packaging containers having a shape such as a gable top, a brick type, a cube or a regular tetrahedron, other containers in a tray or cup form, containers in a pouch form, and the like with the sealing material layer side faced inward depending upon its purpose, application, or the like.

A molding method for obtaining such a packaging container is not particularly limited, and the oxygen-absorbing multi-layer body may be molded by reheating it at a temperature of not higher than a melting point of the resin constituting it and subjecting it to a thermoforming method such as drawing, vacuum forming, pressure forming or press forming. A stretched molded article can be obtained by uniaxial stretching or biaxial stretching by a roll stretching method, a pantograph type stretching method, an inflation stretching method, or the like.

The packaging container obtained from the oxygen-absorbing multi-layer body of the invention is able to accommodate therein various commodities, for example, liquid foodstuffs represented by liquid beverages such as milks, juices, sake, whiskey, shochu, coffees, teas, jelly beverages or health drinks; seasonings such as seasoning liquids, sauces, soy sauce, dressings, liquid stocks, mayonnaise, miso or grated spices; pasty foodstuffs such as jams, creams, chocolate pastes, yogurt or jellies; liquid processed foodstuffs such as liquid soups, boiled foods, pickles or stews; or the like, high-water content foodstuffs represented by raw noodles and boiled noodles such as soba, udon or Chinese noodles; rice before cooking such as milled rice, humidity-controlled rice or wash-free rice and processed rice products such as boiled rice, boiled rice cooked with fish, meat and vegetables, sweet red bean rice or rice porridge; powdered seasonings such as powdered soups or powdered soup stocks; lunch boxes to be used in convenience stores; besides, chemicals in a solid state or solution state such as agricultural chemicals or insecticides; drugs in a liquid state or paste state; cosmetics such as toilet lotions, facial creams, milky lotions, hair liquids or hair dyes; cleaning materials such as shampoos, soaps or detergents; electronics materials; recording media; and the like.

The packaging container of the invention can prevent oxidative corrosion or the like of the article thereby excellently keeping qualities thereof over a long period of time, since oxygen does not permeate from the outside of the container and oxygen on the inside of the container is absorbed by the oxygen absorbent layer.

EXAMPLES

The invention is more specifically described below with reference to the following Preparation Examples and Examples. Parts and percentages in the respective Examples are on a mass basis unless otherwise indicated.

Respective properties were evaluated in the following methods.

[Weight-Average Molecular Weight (Mw) of a Cyclized Product of a Conjugated Diene Polymer]

This is determined as a molecular weight in terms of polystyrene by employing gel permeation chromatography.

[Rate of Reduction of Unsaturated Bonds of a Cyclized Product of a Conjugated Diene Polymer]

This is determined by means of proton NMR measurement referring to methods described in the following documents (i) and (ii).

(i) M. A. Golub and J. Heller, *Can. J. Chem.*, Vol. 41. p. 937 (1963)

(ii) Y. Tanaka and H. Sato, *J. Polym. Sci.: Poly. Chem. Ed.*, Vol. 17, p. 3027 (1979)

In the conjugated diene monomer unit segment in the conjugated diene polymer, a peak area of all protons and a peak area of protons bonded directly to the double bond before the cyclization reaction are defined as SBT and SBU, respectively; and a peak area of all protons and a peak area of protons bonded directly to the double bond after the cyclization reaction are defined as SAT and SAU, respectively. A peak area ratio (SB) of protons bonded directly to the double bond before the cyclization reaction is SB=SBU/SBT; and a peak area ratio (SA) of protons bonded directly to the double bond after the cyclization reaction is SA=SAU/SAT.

Accordingly, the rate of reduction of unsaturated bonds is determined by the following expression.

[Rate of reduction of unsaturated bonds(%)]=100×(SB−SA)/SB

[Oxygen Concentration]

This is measured by using an oxygen concentration meter (a trade name: FOOD CHECKER HS-750, manufactured by Ceramatec, Inc., U.S.A.).

[Odor after Oxygen Absorption]

An oxygen absorbent film is cut into a size of 100 mm×100 mm and put in an aluminum pouch having a size of 300 mm×400 mm (HI RETORT ALUMINUM ALH-9 available from Sakura Bussan K.K.); air on the inside is completely removed; 100 cc of air is then enclosed therein; the pouch is stored at 60° C. for 7 days and then opened; odors are evaluated by five panelists according to the following criteria; and evaluation scores thereof are averaged. The lower the evaluation score, the smaller the odor is.

Evaluation score 0: An odor is not felt at all.
Evaluation score 1: An odor is slightly felt.
Evaluation score 2: An odor is felt a little.
Evaluation score 4: An acid odor is strong.
Evaluation score 5: An acid odor is considerably strong.

[Oxygen Absorbability]

A non-stretched polypropylene film having a thickness of 30 μm (one prepared by using propylene of a trade name "F-734NP" available from Idemitsu Petrochemical Co., Ltd. and having a melt flow rate of 6.9) as a sealing material film and a polyvinyl alcohol film having a thickness of 20 μm (one prepared by using a polyvinyl alcohol of a trade name "EVAL E105" available from Kuraray Co., Ltd. and having a melt flow rate of 5.5) as a gas barrier material film are used and subjected to lamination bonding in the order of gas barrier material film/oxygen absorbent film/sealing material film by a hot roll laminator (a trade name "EXCELAM II 355Q" available from Gmp Co., Ltd.). The obtained laminated film is folded in half so as to have a size of 200 mm long and 100 mm wide; two sides thereof are heat-sealed to form a bag; and the remaining one side is then heat-sealed so as to contain air of 100 cc (oxygen concentration: 20.7%).

This is stored at 23° C. for 7 days, and an oxygen concentration in the bag is then measured.

The lower this oxygen concentration, the more excellent the oxygen absorbability is.

Preparation Example 1

Preparation of a Cyclized Product A1 of a Conjugated Diene Polymer

A pressure-resistant reactor equipped with a stirrer, a thermometer, a reflux condenser and a nitrogen gas introduction pipe was charged with 300 parts of polyisoprene (cis-1,4-bond structural unit: 73%, trans-1,4-bond structural unit: 22%, 3,4-bond structural unit: 5%, weight-average molecular weight: 154,000) as cut into a size of 10 mm in square along with 700 parts of cyclohexane, and the inside of the reactor was purged with nitrogen. The contents were heated at 75° C.; polyisoprene was completely dissolved in cyclohexane under stirring; 3.0 parts of p-toluenesulfonic acid having a water content of not more than 150 ppm in a state of a 25% toluene solution was then added; and cyclization reaction was carried out at 80° C. or below. The reaction was continued for 7 hours, and 1.16 parts of a 25% sodium carbonate aqueous solution was then added to stop the reaction. Water was removed at 80° C. by means of azeotropic reflux dehydration, and the catalyst residue in the system was then removed by using a glass fiber filter having a pore size of 2 μm to give a solution of a cyclized product A10 of polyisoprene.

To the obtained solution of the cyclized product A10 of polyisoprene, a hindered phenolic antioxidant, 2,4-bis-(n-octylthio)-6-(4-hydroxy-3,5-di-t-butylanilino)-1,3,5-triazine in an amount corresponding to 100 ppm relative to the cyclized product A10 of polyisoprene and a phosphorus-containing antioxidant, 2,2'-methylenebis(4,6-di-t-butylphenyl)octyl phosphite in an amount corresponding to 200 ppm relative to the cyclized product A10 of polyisoprene were added; a part of cyclohexane in the solution was then distilled off; and cyclohexane and toluene were further removed by vacuum drying to give an antioxidant-containing cyclized product A1 of polyisoprene in a solid state. The cyclized product A10 of polyisoprene has a rate of reduction of unsaturated bonds of 71.7% and a weight-average molecular weight of 142,000.

This cyclized product of a conjugated diene polymer A1 was kneaded under a kneading condition of a temperature of a cylinder 1 of 140° C., a temperature of a cylinder 2 of 150° C., a temperature of a cylinder 3 of 160° C., a temperature of a cylinder 4 of 170° C., a temperature of a die of 170° C. and a revolution number of 25 rpm using a short-screw kneading extruder (short-screw kneading extruder available from Ikegai, Ltd. (40φ, L/D=25, die φ=3 mm, single nozzle)) and pelletized to give a pellet a1.

Preparation Example 2

Preparation of a Cyclized Product B1 of a Conjugated Diene Polymer/Polyethylene Blend A solution of a cyclized product B10 of polyisoprene was obtained in the same manner as in Preparation Example 1, expect that the used amount of p-toluenesulfonic acid was changed to 2.19 parts and that the amount of the 25% sodium carbonate aqueous solution added after the cyclization reaction was changed to 0.84 part. To the obtained solution of the cyclized product B10 of polyisoprene, a hindered phenolic antioxidant, 2,4-bis-(n-octylthio)-6-(4-hydroxy-3,5-di-t-butylanilino)-1,3,5-triazine in an amount corresponding to 400 ppm relative to the cyclized product B10 of polyisoprene, a phosphorus-containing antioxidant, 2,2'-methylenebis(4,6-di-t-butylphenyl)octyl phosphite in an amount corresponding to 800 ppm relative to the cyclized product B10 of polyisoprene and 100 parts of a polyethylene pellet having a melt flow rate of 4.0 (a trade name "MORETEC 0438" available from Idemitsu Petrochemical Co., Ltd.) were added; a part of cyclohexane in the solution was then distilled off; and cyclohexane and toluene were further removed by vacuum drying to give an antioxidant-containing cyclized product B1 of polyisoprene/polyethylene blend in a solid state. The cyclized product B10 of polyisoprene has a rate of reduction of unsaturated bonds of 48.9% and a weight-average molecular weight of 141,000.

This cyclized product B1 of a conjugated diene polymer/polyethylene blend was kneaded under the same kneading condition as in Preparation Example 1 and pelletized to give a blend pellet b11.

Blend pellets b12 and b13 of the cyclized product of a conjugated diene polymer B1/polyethylene blend were obtained in the same manner as in Preparation Example 2, except that the amount of the polyethylene pellet was changed to an equivalent amount (300 parts) or a 6-fold amount (1,800 parts) of the cyclized product B1 of a conjugated diene polymer.

Preparation Example 3

Preparation of a Cyclized Product A2 of a Conjugated Diene Polymer

A pressure-resistant reactor equipped with a stirrer, a thermometer, a reflux condenser and a nitrogen gas introduction pipe was charged with 300 parts of a styrene/isoprene block copolymer (weight-average molecular weight: 118,000, styrene unit content: 15%, weight-average molecular weight of styrene chain segment: 11,700) as cut into a size of 10 mm in square along with 700 parts of cyclohexane, and the inside of the reactor was purged with nitrogen. The contents were heated at 75° C.; the styrene/isoprene block copolymer was completely dissolved in cyclohexane under stirring; 3.3 parts of p-toluenesulfonic acid having a water content of not more than 150 ppm in a state of a 15% toluene solution was then added; and cyclization reaction was carried out at a temperature of not higher than 77.5° C. The reaction was continued for 7 hours, and 1.50 parts of a 25% sodium carbonate aqueous solution was then added to stop the reaction. Water was removed at 80° C. by means of azeotropic reflux dehydration, and the catalyst residue in the system was then removed by using a glass fiber filter having a pore size of 2 μm to give a solution of a cyclized product A20 of a styrene/isoprene block copolymer.

To the obtained solution of the cyclized product A20 of a styrene/isoprene block copolymer, hindered phenolic antioxidant, pentaerythritol tetrakis[3-(3,5-di-t-butyl-4-hydroxyphenyl)propionate] in an amount corresponding to 100 ppm relative to the cyclized product A20 of a styrene/isoprene block copolymer and a phosphorus-containing antioxidant, 2,2'-methylenebis(4,6-di-t-butylphenyl)octyl phosphite in an amount corresponding to 2,000 ppm relative to the cyclized product A20 of a styrene/isoprene block copolymer were added; a part of cyclohexane in the solution was then distilled off; and cyclohexane and toluene were further removed by vacuum drying to give an antioxidant-containing cyclized product A2 of polyisoprene in a solid state. The cyclized product A20 of a conjugated diene polymer has a rate of reduction of unsaturated bonds of 68.8% and a weight-average molecular weight of 99,800.

This cyclized product A2 of a conjugated diene polymer was kneaded under a kneading condition of a temperature of a cylinder 1 of 140° C., a temperature of a cylinder 2 of 170° C., a temperature of a cylinder 3 of 180° C., a temperature of a cylinder 4 of 180° C., a temperature of a die of 170° C. and a revolution number of 25 rpm using a short-screw kneading extruder (short-screw kneading extruder available from Ikegai, Ltd. (40 φ, L/D=25, die φ=3 mm, single nozzle)) and pelletized to give a pellet a2.

Preparation Example 4

Preparation of a Cyclized Product B2 of a Conjugated Diene Polymer

A solution of a cyclized product B20 of a styrene/isoprene block copolymer was obtained in the same manner as in Preparation Example 3, expect that the used amount of p-toluenesulfonic acid was changed to 2.48 parts and that the amount of the 25% sodium carbonate aqueous solution to be added after the cyclization reaction was changed to 0.93 part. To the obtained solution of the cyclized product B20 of a styrene/isoprene block copolymer, a hindered phenolic antioxidant, pentaerythritol tetrakis[3-(3,5-di-t-butyl-4-hydroxyphenyl)propionate] in an amount corresponding to 200 ppm relative to the cyclized product B20 of a styrene/isoprene block copolymer and a phosphorus-containing antioxidant, 2,2'-methylenebis(4,6-di-t-butylphenyl)octyl phosphite in an amount corresponding to 3,000 ppm relative to the cyclized product B20 of a styrene/isoprene block copolymer were added; a part of cyclohexane in the solution was then distilled off; and cyclohexane and toluene were further removed by vacuum drying to give an antioxidant-containing cyclized product B2 of a styrene/isoprene block copolymer in a solid state. The cyclized product B20 of a conjugated diene polymer has a rate of reduction of unsaturated bonds of 50.2% and a weight-average molecular weight of 106,000.

This cyclized product B2 of a conjugated diene polymer was kneaded under the same kneading condition as in Preparation Example 3 and pelletized to give a pellet b2.

Examples 1 to 8 and Comparative Examples 1 to 4

The pellets a1 and a2, the blend pellets b11, b12 and b13 and b2 were mixed in a proportion as shown in Table 1, and blend pellets e to 1 (oxygen absorbents P1 to P8) and blend pellets a to d (oxygen absorbents PC1 to PC4) as shown in Table 1 were obtained in the same manner as in Preparation Example 1, except that a kneading condition of a temperature of a cylinder 1 of 145° C., a temperature of a cylinder 2 of 175° C., a temperature of a cylinder 3 of 185° C., a temperature of a cylinder 4 of 190° C., a temperature of a die of 190° C. and a revolution number of 25 rpm was employed.

TABLE 1

| | | | Example 1 | Example 2 | Example 3 | Example 4 | Example 5 | Example 6 |
|---|---|---|---|---|---|---|---|---|
| Pellet No. | | | e | f | g | h | i | j |
| Raw material pellet components | | Rate of reduction of unsaturated bonds (%) | | | | | | |
| a1 | Cyclized product A1 of a conjugated diene polymer | 71.7 | 64 | 75 | 87 | 64 | — | — |
| a2 | Cyclized product A2 of a conjugated diene polymer | 68.8 | — | — | — | — | 75 | 70 |
| Total of cyclized product A | | | 64 | 75 | 87 | 64 | 75 | 70 |
| Blend | Blend pellet No. | | b11 | b11 | b11 | b12 | b13 | — |
| | Cyclized product B1 of a conjugated diene polymer | 48.9 | 27 | 18.75 | 9.75 | 27 | 18.75 | — |
| | Polyethylene (PE) | — | 9 | 6.25 | 3.25 | 27 | 112.5 | — |
| b2 | Cyclized product B2 of a conjugated diene polymer | 50.2 | — | — | — | — | — | 30 |
| Total of cyclized product B | | | 27 | 18.75 | 9.75 | 27 | 18.75 | 30 |
| Total of (cyclized product B + PE) | | | 36 | 25 | 13 | 54 | 131.25 | 30 |
| Cyclized product A/cyclized product B ratio (exclusive of polyethylene) | | | 70/30 | 80/20 | 90/10 | 70/30 | 80/20 | 70/30 |
| Polyethylene content (%) | | | 9 | 6.25 | 3.25 | 22.88 | 54.55 | 0 |
| Oxygen absorbent | | | P1 | P2 | P3 | P4 | P5 | P6 |

| | | | Example 7 | Example 8 | Comparative Example 1 | Comparative Example 2 | Comparative Example 3 | Comparative Example 4 |
|---|---|---|---|---|---|---|---|---|
| Pellet No. | | | k | l | a | b | c | d |
| Raw material pellet components | | | | | | | | |
| a1 | Cyclized product A1 of a conjugated diene polymer | 71.7 | 75 | — | 100 | — | — | — |
| a2 | Cyclized product A2 of a conjugated diene polymer | 68.8 | — | 80 | — | — | 100 | — |
| Total of cyclized product A | | | 75 | 80 | 100 | 0 | 100 | 0 |
| Blend | Blend pellet No. | | — | — | — | b11 | — | — |
| | Cyclized product B1 of a conjugated diene polymer | 48.9 | — | — | — | 75 | — | — |
| | Polyethylene (PE) | — | — | — | — | 25 | — | — |
| b2 | Cyclized product B2 of a conjugated diene polymer | 50.2 | 25 | 20 | — | — | — | 100 |
| Total of cyclized product B | | | 25 | 20 | 0 | 75 | 0 | 100 |
| Total of (cyclized product B + PE) | | | 25 | 20 | 0 | 100 | 0 | 100 |
| Cyclized product A/cyclized product B ratio (exclusive of polyethylene) | | | 75/25 | 80/20 | 100/0 | 0/100 | 100/0 | 0/100 |
| Polyethylene content (%) | | | 0 | 0 | 0 | 25 | 0 | 50 |
| Oxygen absorbent | | | P7 | P8 | PC1 | PC2 | PC3 | PC4 |

Examples 9 to 16 and Comparative Examples 5 to 8

The blend pellets e to l (oxygen absorbents P1 to P8) and pellets a to d (oxygen absorbents PC1 to PC4) were extruded into oxygen absorbent films (F1 to F8 and FC1 to FC4) each having a width of 100 mm and a thickness of from 20 to 25 μm, respectively from a molding apparatus configured by connecting a T-die (die temperature: 200° C.) and a twin-screw stretching tester (available from Toyo Seiki Seisaku-Sho, Ltd.) to a LABO PLASTOMIL short-screw extruder (available from Toyo Seiki Seisaku-Sho, Ltd.) The obtained oxygen absorbent films were evaluated for the odor after oxygen absorption and the oxygen absorbability.

The results are shown in Table 2.

TABLE 2

|  | Example 9 | Example 10 | Example 11 | Example 12 | Example 13 | Example 14 |
|---|---|---|---|---|---|---|
| Oxygen absorbent | P1 | P2 | P3 | P4 | P5 | P6 |
| Film No. | F1 | F2 | F3 | F4 | F5 | F6 |
| Odor after oxygen absorption | 1.8 | 1.6 | 1.5 | 1.8 | 1.6 | 1.3 |
| Oxygen absorbability | 0.1 | 0.4 | 0.9 | 0.2 | 0.8 | 0.1 |

|  | Example 15 | Example 16 | Comparative Example 5 | Comparative Example 6 | Comparative Example 7 | Comparative Example 8 |
|---|---|---|---|---|---|---|
| Oxygen absorbent | P7 | P8 | PC1 | PC2 | PC3 | PC4 |
| Film No. | F7 | F8 | FC1 | FC2 | FC3 | FC4 |
| Odor after oxygen absorption | 1.1 | 1.2 | 1.4 | 4.2 | 1.2 | 4.2 |
| Oxygen absorbability | 0.2 | 0.3 | 20.4 | 0.1 | 20.4 | 0.3 |

From the results of Tables 1 and 2, it is noted that the oxygen absorbent film of the invention comprising, as a cyclized product of a conjugated diene polymer, the cyclized product (A) of a conjugated diene polymer and the cyclized product (B) of a conjugated diene polymer, wherein a rate of reduction of unsaturated bonds (%) of the cyclized product (B) of a conjugated diene polymer is at least 5 points smaller than a rate of reduction of unsaturated bonds (%) of the cyclized product (A) of a conjugated diene polymer, is less odorous after oxygen absorption.

It is also noted that the oxygen-absorbing multi-layer body obtained by using the foregoing oxygen absorbent film of the invention exhibits excellent oxygen absorbability.

In contrast, it is noted that though the oxygen absorbent films FC1 and FC3 comprising, as a cyclized product of a conjugated diene polymer, only the cyclized product (A) of a conjugated diene polymer (Comparative Examples 1 and 3) are less odorous, the oxygen-absorbing multi-layer body obtained by using such an oxygen absorbent film is inferior with respect to oxygen absorbability.

On the other hand, it is noted that though the oxygen absorbent films FC2 and FC4 comprising, as a cyclized product of a conjugated diene polymer, only the cyclized product (B) of a conjugated diene polymer (Comparative Examples 2 and 4) are excellent with respect to oxygen absorbability of an oxygen-absorbing multi-layer body using such an oxygen absorbent film, they are strongly odorous after oxygen absorption.

The invention claimed is:

1. An oxygen absorbent comprising a cyclized product (A) of a conjugated diene polymer which is a cyclized product of a styrene/isoprene block copolymer or a cyclized product of polyisoprene and a cyclized product (B) of a conjugated diene polymer which is a cyclized product of polyisoprene or a cyclized product of a styrene/isoprene block copolymer, wherein a rate of reduction of unsaturated bonds (%) of the cyclized product (B) of a conjugated diene polymer is at least 10 points smaller than a rate of reduction of unsaturated bonds (%) of the cyclized product (A) of a conjugated diene polymer, and wherein the oxygen absorbent contains no transition metal salts.

2. The oxygen absorbent according to claim 1, wherein the rate of reduction of unsaturated bonds of the cyclized product (A) of a conjugated diene polymer is 60% or more.

3. The oxygen absorbent according to claim 2, wherein the rate of reduction of unsaturated bonds of the cyclized product (A) of a conjugated diene polymer is from 65 to 75%.

4. The oxygen absorbent according to claim 1 or claim 3 wherein the rate of reduction of unsaturated bonds of the cyclized product (B) of a conjugated diene polymer is less than 60%.

5. The oxygen absorbent according to claim 4, wherein the rate of reduction of unsaturated bonds of the cyclized product (B) of a conjugated diene polymer is from 40 to 55%.

6. The oxygen absorbent according to claim 1, wherein a content ratio by weight of cyclized product (A) of a conjugated diene polymer/cyclized product (B) of a conjugated diene polymer is from 60/40 to 95/5.

7. The oxygen absorbent according to claim 1, wherein each of the cyclized product (A) of a conjugated diene polymer and the cyclized product (B) of a conjugated diene polymer has a weight-average molecular weight of from 10,000 to 1,000,000.

8. The oxygen absorbent according to claim 1, wherein the cyclized product (A) of a conjugated diene polymer is a cyclized product of a styrene/isoprene block copolymer, and the cyclized product (B) of a conjugated diene polymer is a cyclized product of polyisoprene.

9. The oxygen absorbent according to claim 1, wherein the cyclized product (A) of a conjugated diene polymer is a cyclized product of polyisoprene, and the cyclized product (B) of a conjugated diene polymer is a cyclized product of a styrene/isoprene block copolymer.

10. The oxygen absorbent according to claim 1, further comprising a thermoplastic resin (C) and having a ratio of the component (C) to the total sum of the component (A), the component (B) and the component (C) of not more than 70% by weight.

11. The oxygen absorbent according to claim 10, wherein the thermoplastic resin (C) is at least one member selected from the group consisting of poly-α-olefin resins, polyester resins, polyamide resins and polyvinyl alcohol resins.

12. The oxygen absorbent according to claim 1, containing from 0 to 3,000 ppm of an antioxidant.

13. An oxygen-absorbing multi-layer body comprising a gas barrier material layer, an oxygen absorbent layer comprising the oxygen absorbent according to claim 1 and a sealing material layer laminated in this order.

14. The oxygen-absorbing multi-layer body according to claim 13, having a film or sheet form.

15. A packaging container comprising the oxygen-absorbing multi-layer body according to claim 13.

* * * * *